(12) United States Patent
TeNyenhuis et al.

(10) Patent No.: US 11,410,052 B2
(45) Date of Patent: Aug. 9, 2022

(54) SYSTEM FOR MINIMIZING REEVALUATION OF A GROUND TRUTH CORPUS IN RESPONSE TO CONCEPT DRIFT

(71) Applicant: International Business Machines Corporation, Armonk, NY (US)

(72) Inventors: Tristan A. TeNyenhuis, West Islip, NY (US); Andrew R. Freed, Cary, NC (US); Jocelyn Kong, Jersey City, NJ (US); Allegra Larche, Sunnyvale, CA (US); Christopher R. Weber, Rockville Centre, NY (US)

(73) Assignee: International Business Machines Corporation, Armonk, NY (US)

( * ) Notice: Subject to any disclaimer, the term of this patent is extended or adjusted under 35 U.S.C. 154(b) by 865 days.

(21) Appl. No.: 16/256,633

(22) Filed: Jan. 24, 2019

(65) Prior Publication Data

US 2020/0242485 A1 Jul. 30, 2020

(51) Int. Cl.
*G06F 16/93* (2019.01)
*G06N 5/02* (2006.01)
(Continued)

(52) U.S. Cl.
CPC ......... *G06N 5/022* (2013.01); *G06F 16/9024* (2019.01); *G06F 16/93* (2019.01);
(Continued)

(58) Field of Classification Search
CPC .... G06N 5/022; G06N 20/00; G06F 16/9024; G06F 16/93; G06K 9/6217
See application file for complete search history.

(56) References Cited

U.S. PATENT DOCUMENTS 9,171,253 B1 10/2015 Wright et al.
9,195,946 B2 11/2015 Dayan et al.
(Continued)

OTHER PUBLICATIONS

Rob High, "The Era of Cognitive Systems: An Inside Look at IBM Watson and How it Works," IBM Redbooks, 2012.
(Continued)

*Primary Examiner* — Hau H Hoang
(74) *Attorney, Agent, or Firm* — Terrile, Cannatti & Chambers, LLP; Stephen A. Terrile

(57) ABSTRACT

A method, system and computer-usable medium are disclosed for minimizing reevaluation of a ground truth corpus in response to concept drift. Certain embodiments are directed to a computer implemented comprising: generating a knowledge graph using a ground truth corpus, where the knowledge graph includes concept nodes, context definition nodes, and document nodes, where each concept node has one or more edges to a context definition node and to a document node; updating a context definition node in the knowledge graph based on context drift; identifying edges between the updated context definition node and concept nodes affected by the updated context definition; and identifying edges between the affected concept nodes and corresponding document nodes to identify document nodes affected by the context drift; and reevaluating documents in the ground truth corpus corresponding to the affected document nodes pursuant to updating the ground truth corpus to compensate for the context drift.

17 Claims, 13 Drawing Sheets

(51) Int. Cl.
  *G06K 9/62* (2022.01)
  *G06F 16/901* (2019.01)
  *G06F 40/211* (2020.01)
  *G06F 16/332* (2019.01)
(52) U.S. Cl.
  CPC .......... G06F 40/211 (2020.01); G06K 9/6217 (2013.01); *G06F 16/3329* (2019.01)

(56) References Cited

U.S. PATENT DOCUMENTS

| | | |
|---|---|---|
| 2008/0071721 A1 | 3/2008 | Wang et al. |
| 2014/0172756 A1* | 6/2014 | Clark ..................... G06N 5/022 706/12 |
| 2014/0207717 A1 | 7/2014 | Schmidtler et al. |
| 2017/0103340 A1 | 4/2017 | Zoldi et al. |
| 2018/0121815 A1 | 5/2018 | Lamparter et al. |
| 2018/0150036 A1 | 5/2018 | Xu et al. |

OTHER PUBLICATIONS

Michael Yuan et al., "Watson and Healthcare," IBM developerWorks, 2011.

IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

Jing Gao et al., A General Framework for Mining Concept-Drifting Data Streams with Skewed Distributions, SIAM Int'l Conference on Data Mining, 2007, https://www.cse.buffalo.edu//~jing/doc/sdm07_jinggao.pdf.

Wikipedia, Concept Drift, https://en.wikipedia.org/wiki/Concept_drift, downloaded Jan. 24, 2019.

T. Ryan Hoens et al., Learning from Streaming Data with Concept Drift and Imbalance: An Overview, Prog Artif Intell (2012) 1:89-101, 2012, https://link.springer.com/content/pdf/10.1007%2Fs13748-011-0008-0.pdf.

George Forman, HP, Tackling Concept Drift by Temporal Inductive Transfer, Jun. 20, 2006, SIGIR '06 Aug. 6-11, 2006, Seattle WA, http://shiftleft.com/mirrors/www.hpl.hp.com/techreports/2006/HPL-2006-20R1.pdf.

Wang, Shenghui et al., "What is concept drift and how to measure it?," International Conference on Knowledge and Engineering and Knowledge Management, Springer, Berlin, Heidelberg, 2010.

Shenghui Wnag et al., "Concept Drift and how to identify it," Web Semantics: Science, Services and Agents on the World Wide Web 9.3 (2011): 247-265.

* cited by examiner

SYSTEM FOR MINIMIZING REEVALUATION OF A GROUND TRUTH CORPUS IN RESPONSE TO CONCEPT DRIFT

BACKGROUND OF THE INVENTION

Field of the Invention

The present invention relates in general to the field of computers and similar technologies, and in particular to software utilized in this field. Still more particularly, it relates to a method, system and computer-usable medium for minimizing reevaluation of a ground truth corpus in response to concept drift.

Description of the Related Art

In the field of artificially intelligent computer systems capable of answering questions posed in natural language, cognitive question answering (QA) systems (such as the IBM Watson™ artificially intelligent computer system or and other natural language question answering systems) process questions posed in natural language to determine answers and associated confidence scores based on knowledge acquired by the QA system. In operation, users submit one or more questions through a front-end application user interface (UI) or application programming interface (API) to the QA system where the questions are processed to generate answers that are returned to the user(s). The QA system generates answers from an ingested knowledge base corpus, including publicly available information and/or proprietary information stored on one or more servers, Internet forums, message boards, or other online discussion sites. Using the ingested information, the QA system can formulate answers using artificial intelligence (AI) and natural language processing (NLP) techniques to provide answers with associated evidence and confidence measures. However, the quality of the answer depends on the ability of the QA system to identify and process information contained in the knowledge base corpus thereby making the quality of the knowledge base corpus in important factor in assuring the overall quality of the operation of the QA system.

SUMMARY OF THE INVENTION

A method, system and computer-usable medium are disclosed for minimizing the reevaluation of a ground truth corpus in response to concept drift. In certain embodiments, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a computer-implemented method for minimizing reevaluation of a ground truth corpus in response to concept drift, including: generating a knowledge graph using a ground truth corpus, where the knowledge graph includes concept nodes, context definition nodes, and document nodes, where each concept node has one or more edges to a context definition node and to a document node; updating a context definition node in the knowledge graph based on context drift; identifying edges between the updated context definition node and concept nodes affected by the updated context definition; and identifying edges between the affected concept nodes and corresponding document nodes to identify document nodes affected by the context drift; and reevaluating documents in the ground truth corpus corresponding to the affected document nodes pursuant to updating the ground truth corpus to compensate for the context drift. Other embodiments of this aspect include corresponding computer systems, apparatus, and computer programs recorded on one or more computer storage devices, each configured to perform the actions of the methods.

Another general aspect includes a system including: a processor; a data bus coupled to the processor; and a non-transitory, computer-readable storage medium embodying computer program code, the non-transitory, computer-readable storage medium being coupled to the data bus, the computer program code interacting with a plurality of computer operations and including instructions executable by the processor and configured for: generating a knowledge graph using a ground truth corpus, where the knowledge graph includes concept nodes, context definition nodes, and document nodes, where each concept node has one or more edges to a context definition node and to a document node; updating a context definition node in the knowledge graph based on context drift; identifying edges between the updated context definition node and concept nodes affected by the updated context definition; and identifying edges between the affected concept nodes and corresponding document nodes to identify document nodes affected by the context drift; and reevaluating documents in the ground truth corpus corresponding to the affected document nodes pursuant to updating the ground truth corpus to compensate for the context drift. Other embodiments of this aspect include corresponding computer systems, apparatus, and computer programs recorded on one or more computer storage devices, each configured to perform the actions of the methods.

Another general aspect includes a non-transitory, computer-readable storage medium embodying computer program code, the computer program code including computer executable instructions configured for: generating a knowledge graph using a ground truth corpus, where the knowledge graph includes concept nodes, context definition nodes, and document nodes, where each concept node has one or more edges to a context definition node and to a document node; updating a context definition node in the knowledge graph based on context drift; identifying edges between the updated context definition node and concept nodes affected by the updated context definition; and identifying edges between the affected concept nodes and corresponding document nodes to identify document nodes affected by the context drift; and reevaluating documents in the ground truth corpus corresponding to the affected document nodes pursuant to updating the ground truth corpus to compensate for the context drift. Other embodiments of this aspect include corresponding computer systems, apparatus, and computer programs recorded on one or more computer storage devices, each configured to perform the actions of the methods.

BRIEF DESCRIPTION OF THE DRAWINGS

The present invention may be better understood, and its numerous objects, features and advantages made apparent to those skilled in the art by referencing the accompanying

DETAILED DESCRIPTION

Figure 1:
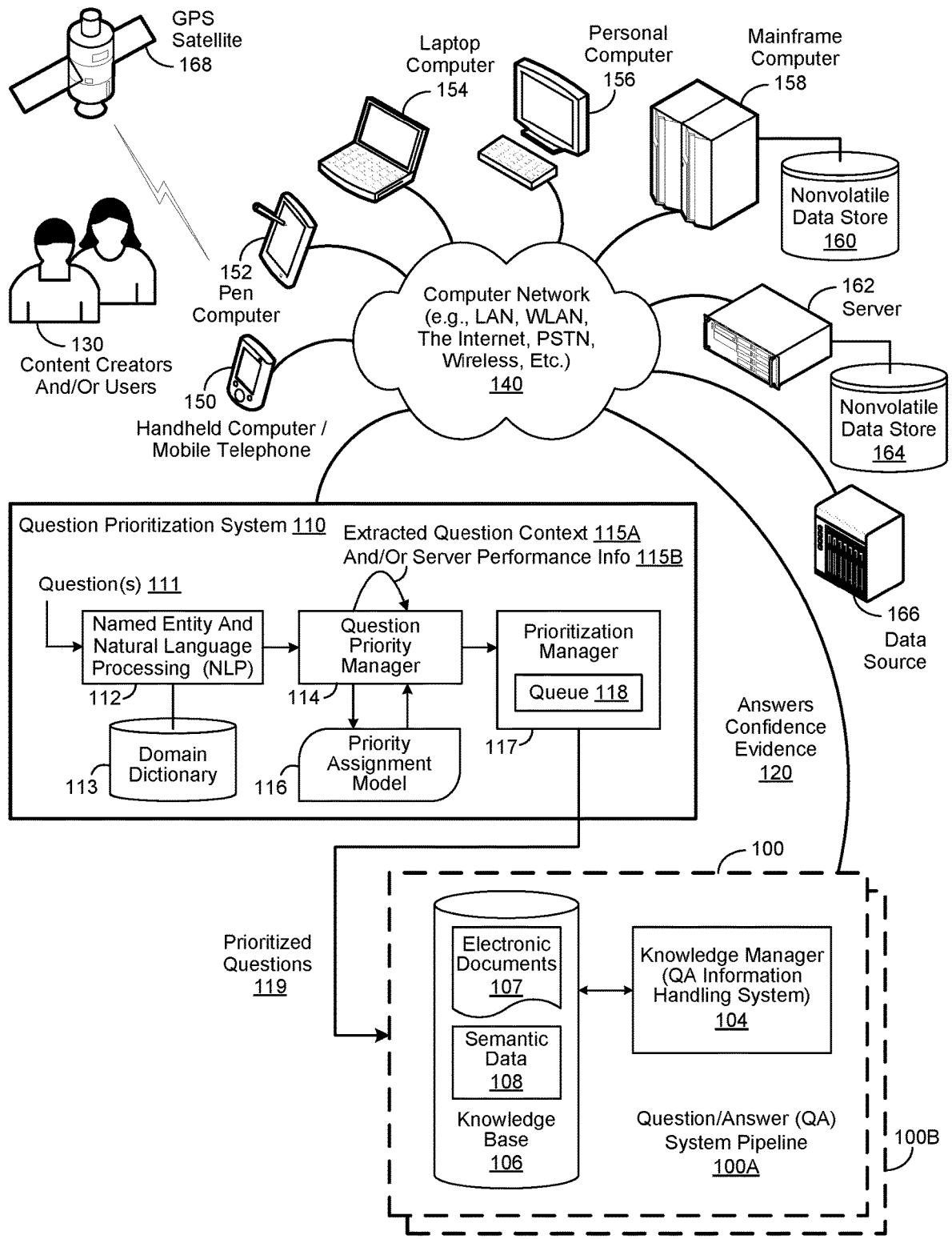
FIG. 1 shows a schematic diagram of one illustrative embodiment of a question/answer (QA) system.

Context documentation may define or explain a concept. In order to build a machine learning model capable of determining whether a passage is related to a concept, a corpus of ground truth is gathered and curated. This ground truth corpus provides examples which accurately interpret the defined concept within the context documents. However, when given multiple concepts, multiple contextual documents, and both explicit and implicit relationships with the ground truth, it can be cumbersome to manage the corpora. When there is a change in the definition provided by a context document, it is difficult to identify what corpus examples may need reevaluation.

Various aspects of the present disclosure include an appreciation that a knowledge may be generated from a ground truth corpus more efficiently reevaluate documents of the corpus relating to concepts that drift over time. Certain aspects of the present disclosure include an appreciation that the accuracy of a QA system may be degraded as a result of such concept drift. Certain aspects of the present disclosure also include an appreciation that it may be difficult to update a ground truth corpus to compensate for concept drift, particularly with corpora including a significant number of documents. Certain aspects of the present disclosure also include an appreciation that failures to update a ground truth corpus to compensate for concept drift may impair the accuracy of the corresponding QA system.

Various aspects of the present disclosure recognize that generating a knowledge graph from the ground truth corpus with intelligently designed relationships may allow a more effective targeting of documents within the corpus that should be reevaluated in response to concept drift. In certain embodiments, management of the corpus may be enhanced by, for example, creating at least two explicit relationships. In certain embodiments, for example, a link is created between a defined concept and the ground truth source passage. In certain embodiments, thereafter, a link between the concept and the defining context documentation is generated. In certain embodiments, whenever the definition of a concept has changed, driven by a change in the contextual definition documents, the ground truth may be queried for the documents that may need re-evaluation. In certain embodiments, re-evaluating the ground truth corpus will provide an audit trail, which allows substantiation of the definition of a concept through both the context defining knowledge base and the representative passages that have been curated.

The present invention may be a system, a method, and/or a computer program product. In addition, selected aspects of the present invention may take the form of an entirely hardware embodiment, an entirely software embodiment (including firmware, resident software, microcode, etc.), or an embodiment combining software and/or hardware aspects that may all generally be referred to herein as a "circuit," "module" or "system." Furthermore, aspects of the present invention may take the form of computer program product embodied in a computer-readable storage medium, or media, having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a dynamic or static random access memory (RAM), a read-only memory (ROM), an erasable programmable read-only memory (EPROM or Flash memory), a magnetic storage device, a portable Compact Disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a Public Switched Circuit Network (PSTN), a packet-based network, a personal area network (PAN), a local area network (LAN), a wide area network (WAN), a wireless network, or any suitable combination thereof. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language, Hypertext Precursor (PHP), or similar programming languages. The computer-readable program instructions may execute entirely on the user's computer, partly on the user's computer, as a stand-alone software package, partly on the user's computer and partly on a remote computer, or entirely on the remote computer or server or cluster of servers. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a sub-system, module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows a schematic diagram of one illustrative embodiment of a QA system 100 and a question prioritization system 110 connected to a computer network 140 to operate as a conversational system. The QA system 100 includes a knowledge manager 104 that is connected to a knowledge base 106 and configured to provide QA generation functionality for one or more content creators and/or users 130 who submit content across the network 140 to the QA system 100. To assist with efficient sorting and presentation of questions to the QA system 100, the question prioritization system 110 may be connected to the computer network 140 to receive user questions, and may include a plurality of sub-systems which interact with cognitive systems, like the QA system 100, to prioritize questions or requests being submitted to the QA system 100.

The Named Entity sub-system 112 receives and processes each question 111 by using natural language processing (NLP) to analyze each question and extract question topic information contained in the question, such as named entities, phrases, urgent terms, and/or other specified terms which are stored in one or more domain entity dictionaries 113. By leveraging a plurality of pluggable domain dictionaries 113 relating to different domains or areas (e.g., travel, healthcare, electronics, game shows, financial services, etc.), the domain dictionary 113 enables critical and urgent words (e.g., "threat level") from different domains (e.g., "travel") to be identified in each question based on their presence in the domain dictionary 113. To this end, the Named Entity sub-system 112 may use an NLP routine to identify the question topic information in each question. As used herein, "NLP" broadly refers to the field of computer science, artificial intelligence, and linguistics concerned with the interactions between computers and human (natural) languages. In this context, NLP is related to the area of human-computer interaction and Natural Language understanding by computer systems that enable computer systems to derive meaning from human or Natural Language input. For example, NLP can be used to derive meaning from a human-oriented question such as, "What is tallest mountain in North America?" and to identify specified terms, such as named entities, phrases, or urgent terms contained in the question. The process identifies key terms and attributes in the question and compares the identified terms to the stored terms in the domain dictionary 113.

The Question Priority Manager sub-system 114 performs additional processing on each question to extract question context information 115A. In addition, or in the alternative, the Question Priority Manager sub-system 114 may also extract server performance information 115B for the question prioritization system 110 and/or QA system 100. In selected embodiments, the extracted question context information 115A may include data that identifies the user context and location when the question was submitted or received. For example, the extracted question context information 115A may include data that identifies the user who submitted the question (e.g., through login credentials), the device or computer which sent the question, the channel over which the question was submitted, or any combination thereof. Other examples may include the location of the user or device that sent the question, any special interest location indicator (e.g., hospital, public-safety answering point, etc.), other context-related data for the question, or any combination thereof. In certain embodiments, the location information is determined through the use of a Geographical Positioning System (GPS) satellite 168. In these embodiments, a handheld computer or mobile telephone 150, or other device, uses signals transmitted by the GPS satellite 168 to generate location information, which in turn is provided via the computer network 140 to the Question Priority Manager sub-system 114 for processing.

In various embodiments, the source for the extracted context information 115A may be a data source 166 accessed through the computer network 140. Examples of a data source 166 include systems that provide telemetry information, such as medical information collected from medical equipment used to monitor a patient's health, environment information collected from a facilities management system, or traffic flow information collected from a transportation monitoring system. In certain embodiments, the data source 166 may be a storage area network (SAN) or other network-based repositories of data.

In various embodiments, the data source 166 may provide data directly or indirectly collected from "big data" sources. In general, big data refers to a collection of datasets so large and complex that traditional database management tools and data processing approaches are inadequate. These datasets can originate from a wide variety of sources, including computer systems (e.g., 156, 158, 162), mobile devices (e.g., 150, 152, 154), financial transactions, streaming media, social media, as well as systems (e.g., 166) commonly associated with a wide variety of facilities and infrastructure (e.g., buildings, factories, transportation systems, power grids, pipelines, etc.). Big data, which is typically a combination of structured, unstructured, and semi-structured data poses multiple challenges, including its capture, curation, storage, transfer, search, querying, sharing, analysis and visualization.

The Question Priority Manager sub-system 114 may also determine or extract selected server performance data 115B for the processing of each question. In certain embodiments, the server performance information 115B may include operational metric data relating to the available processing resources at the question prioritization system 110 and/or QA system 100, such as operational or run-time data, CPU utilization data, available disk space data, bandwidth utilization data, and so forth. As part of the extracted information 115A/B, the Question Priority Manager sub-system 114 may identify the Service Level Agreement (SLA) or Quality of Service (QoS) processing requirements that apply to the question being analyzed, the history of analysis and feedback for the question or submitting user, and the like. Using the question topic information and extracted question context 115A and/or server performance information 115B, the Question Priority Manager sub-system 114 is configured to populate feature values for the Priority Assignment Model 116. In various embodiments, the Priority Assignment Model 116 provides a machine learning predictive model for generating target priority values for the question, such as by using an artificial intelligence (AI) approaches known to those of skill in the art. In certain embodiments, the AI logic is used to determine and assign a question urgency value to each question for purposes of prioritizing the response processing of each question by the QA system 100.

The Prioritization Manager sub-system 117 performs additional sort or rank processing to organize the received questions based on at least the associated target priority values such that high priority questions are put to the front of a prioritized question queue 118 for output as prioritized questions 119. In the question queue 118 of the Prioritization Manager sub-system 117, the highest priority question is placed at the front of the queue for delivery to the assigned QA system 100. In selected embodiments, the prioritized questions 119 from the Prioritization Manager sub-system 117 that have a specified target priority value may be assigned to a particular pipeline (e.g., QA system pipeline 100A, 100B) in the QA system 100. As will be appreciated, the Prioritization Manager sub-system 117 may use the question queue 118 as a message queue to provide an asynchronous communications protocol for delivering prioritized questions 119 to the QA system 100. Consequently, the Prioritization Manager sub-system 117 and QA system 100 do not need to interact with a question queue 118 at the same time by storing prioritized questions in the question queue 118 until the QA system 100 retrieves them. In this way, a wider asynchronous network supports the passing of prioritized questions 119 as messages between different QA system pipelines 100A, 100B, connecting multiple applications and multiple operating systems. Messages can also be passed from queue to queue in order for a message to reach the ultimate desired recipient. An example of a commercial implementation of such messaging software is IBM's WebSphere MQ (previously MQ Series). In selected embodiments, the organizational function of the Prioritization Manager sub-system 117 may be configured to convert over-subscribing questions into asynchronous responses, even if they were asked in a synchronized fashion.

The QA system 100 may include one or more QA system pipelines 100A, 100B, each of which includes a computing device 104 comprising one or more processors and one or more memories. The QA system pipelines 100A, 100B may likewise include potentially any other computing device elements generally known in the art including buses, storage devices, communication interfaces, and the like. In various embodiments, these computing device elements may be implemented to process questions received over the network 140 from one or more content creator and/or users 130 at computing devices (e.g., 150, 152, 154, 156, 158, 162). In certain embodiments, the one or more content creator and/or users 130 are connected over the network 140 for communication with each other and with other devices or components via one or more wired and/or wireless data communication links, where each communication link may comprise one or more of wires, routers, switches, transmitters, receivers, or the like. In this networked arrangement, the QA system 100 and network 140 may enable QA generation functionality for one or more content users 130. Other embodiments of QA system 100 may be used with components, systems, sub-systems, and/or devices other than those that are depicted herein.

In each QA system pipeline 100A, 100B, a prioritized question 119 is received and prioritized for processing to generate an answer 120. In sequence, prioritized questions 119 are de-queued from the shared question queue 118, from which they are de-queued by the pipeline instances for processing in priority order rather than insertion order. In selected embodiments, the question queue 118 may be implemented based on a "priority heap" data structure. During processing within a QA system pipeline (e.g., 100A, 100B), questions may be split into multiple subtasks, which run concurrently. In various embodiments, a single pipeline instance may process a number of questions concurrently, but only a certain number of subtasks. In addition, each QA system pipeline 100A, 100B may include a prioritized queue (not shown) to manage the processing order of these subtasks, with the top-level priority corresponding to the time that the corresponding question started (i.e., earliest has highest priority). However, it will be appreciated that such internal prioritization within each QA system pipeline 100A, 100B may be augmented by the external target priority values generated for each question by the Question Priority Manager sub-system 114 to take precedence, or ranking priority, over the question start time. In this way, more important or higher priority questions can "fast track" through a QA system pipeline 100A, 100B if it is busy with already-running questions.

In the QA system 100, the knowledge manager 104 may be configured to receive inputs from various sources. For example, knowledge manager 104 may receive input from the question prioritization system 110, network 140, a knowledge base or corpus of electronic documents 107 or other data, semantic data 108, content creators, and/or users 130, and other possible sources of input. In selected embodiments, some or all of the inputs to knowledge manager 104 may be routed through the network 140 and/or the question prioritization system 110. The various computing devices (e.g., 150, 152, 154, 156, 158, 162) on the network 140 may include access points for content creators and/or users 130. Some of the computing devices may include devices for a database storing a corpus of data as the body of information used by the knowledge manager 104 to generate answers to cases. The network 140 may include local network connections and remote connections in various embodiments, such that knowledge manager 104 may operate in environments of any size, including local (e.g., a LAN) and global (e.g., the Internet). Additionally, knowledge manager 104 serves as a front-end system that can make available a variety of knowledge extracted from or represented in documents, network-accessible sources and/or structured data sources. In this manner, some processes populate the knowledge manager, with the knowledge manager also including input interfaces to receive knowledge requests and respond accordingly.

In one embodiment, a content creator 130 creates content (e.g., a document) in a knowledge base 106 for use as part of a corpus of data used in conjunction with knowledge manager 104. In selected embodiments, the knowledge base 106 may include any file, text, article, or source of data (e.g., scholarly articles, dictionary definitions, encyclopedia references, and the like) for use by the knowledge manager 104. Content users 130 may access the knowledge manager 104 via a network connection or an Internet connection to the network 140, and may input questions to the knowledge manager 104 that may be answered by the content in the corpus of data.

As further described below, when a process evaluates a given section of a document for semantic content, the process can use a variety of conventions to query it from the knowledge manager 104. One convention is to send a well-formed question. As used herein, semantic content broadly refers to content based upon the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., Natural Language questions, etc.) to the knowledge manager 104. In various embodiments, the knowledge manager 104 may interpret the question and provide a response to the content user containing one or more answers to the question. In some embodiments, the knowledge manager 104 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input prioritized question 119 and the language used in each of the portions of the corpus of data found during the application of the queries using a variety of reasoning algorithms. There may be hundreds or even thousands of reasoning algorithms applied, each of which performs different analysis (e.g., comparisons), and generates a score. For example, certain reasoning algorithms may look at the matching of terms and synonyms within the language of the input question and the found portions of the corpus of data. Other reasoning algorithms may look at temporal or spatial features in the language, while yet others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 120 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information processing systems that can utilize QA system 100 range from small handheld devices, such as handheld computer/mobile telephone 150 to large mainframe systems, such as mainframe computer 158. Examples of handheld computer 150 include personal digital assistants (PDAs), personal entertainment devices, such as MP3 players, portable televisions, and Compact Disc players. Other examples of information processing systems include pen, or tablet, computer 152, laptop, or notebook, computer 154, personal computer system 156, server 162, and mainframe computer 158.

As shown, the various information processing systems can be networked together using computer network 140. Types of computer network 140 that can be used to interconnect the various information processing systems include PANs, LANs, Wireless Local Area Networks (WLANs), the Internet, the PSTN, other wireless networks, and any other network topology that can be used to interconnect the information processing systems.

Figure 2:
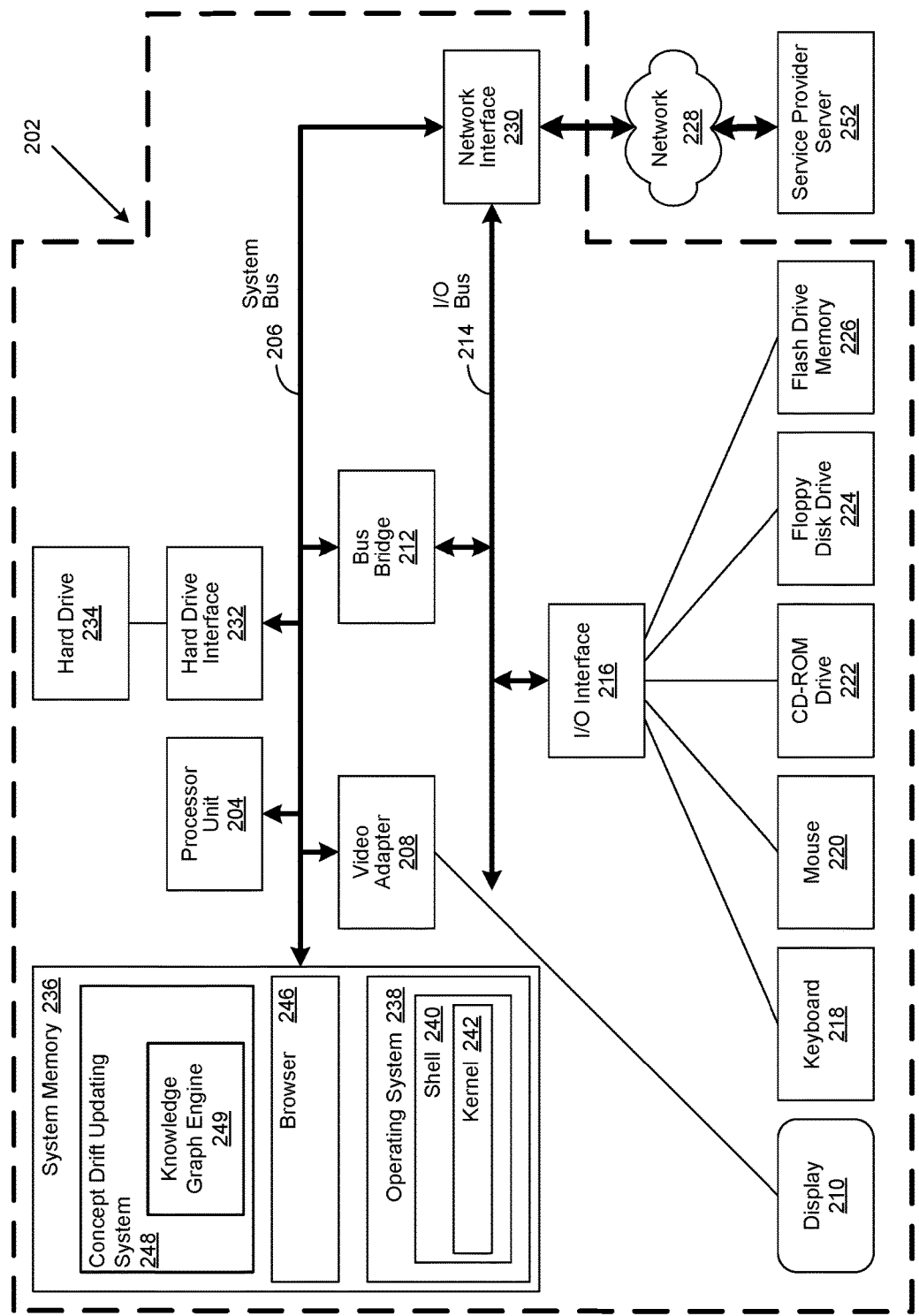
FIG. 2 shows a simplified block diagram of an information processing system capable of performing computing operations.

In selected embodiments, the information processing systems include nonvolatile data stores, such as hard drives and/or nonvolatile memory. Some of the information processing systems may use separate nonvolatile data stores. For example, server 162 utilizes nonvolatile data store 164, and mainframe computer 158 utilizes nonvolatile data store 160. The nonvolatile data store can be a component that is external to the various information processing systems or can be internal to one of the information processing systems. An illustrative example of an information processing system showing an exemplary processor and various components commonly accessed by the processor is shown in FIG. 2.

In various embodiments, the QA system 100 is implemented to receive a variety of data from various computing devices (e.g., 150, 152, 154, 156, 158, 162) and data sources 166, which in turn is used to perform QA operations described in greater detail herein. In certain embodiments, the QA system 100 may receive a first set of information from a first computing device (e.g., laptop computer 154). The QA system 100 then uses the first set of data to perform QA processing operations resulting in the generation of a second set of data, which in turn is provided to a second computing device (e.g., server 162). In response, the second computing device may process the second set of data to generate a third set of data, which is then provided back to the QA system 100. In turn, the QA system may perform additional QA processing operations on the third set of data to generate a fourth set of data, which is then provided to the first computing device.

In certain embodiments, a first computing device (e.g., server 162) may receive a first set of data from the QA system 100, which is then processed and provided as a second set of data to another computing device (e.g., mainframe 158). The second set of data is processed by the second computing device to generate a third set of data, which is provided back to the first computing device. The second computing device then processes the third set of data to generate a fourth set of data, which is then provided to the QA system 100, where it is used to perform QA operations described in greater detail herein.

In one embodiment, the QA system may receive a first set of data from a first computing device (e.g., handheld computer/mobile device 150), which is then used to perform QA operations resulting in a second set of data. The second set of data is then provided back to the first computing device, where it is used to generate a third set of data. In turn, the third set of data is provided back to the QA system 100, which then provides it to a second computing device (e.g., mainframe computer 158), where it is used to perform post processing operations.

As an example, a content user 130 may ask the question, "I'm looking for a good pizza restaurant nearby." In response, the QA system 100 may provide a list of three such restaurants in a half mile radius of the content user. In turn, the content user 130 may then select one of the recommended restaurants and ask for directions, signifying their intent to proceed to the selected restaurant. In this example, the list of recommended restaurants, and the restaurant the content user 130 selected, would be the third set of data provided to the QA system 100. To continue the example, the QA system 100 may then provide the third set of data to the second computing device, where it would be processed to generate a database of the most popular restaurants, by classification, location, and other criteria.

In various embodiments the exchange of data between various computing devices (e.g., 150, 152, 154, 156, 158, 162) results in more efficient processing of data as each of the computing devices can be optimized for the types of data it processes. Likewise, the most appropriate data for a particular purpose can be sourced from the most suitable computing device (e.g., 150, 152, 154, 156, 158, 162), or data source 166, thereby increasing processing efficiency. Skilled practitioners of the art will realize that many such embodiments are possible and that the foregoing is not intended to limit the spirit, scope or intent of the invention.

FIG. 2 illustrates an information processing system 202, more particularly, a processor and common components, which is a simplified example of a computer system capable of performing the computing operations described herein. Information processing system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disc-Read-Only Memory (CD-ROM) drive 222, a floppy disk drive 224, and a flash drive memory 226. The format of the ports connected to I/O interface 216 may be any known to those skilled in the art of computer architecture, including, but not limited to Universal Serial Bus (USB) ports.

The information processing system 202 is able to communicate with a service provider server 252 via a network 228 using a network interface 230, which is coupled to system bus 206. Network 228 may be an external network such as the Internet, or an internal network such as an Ethernet Network or a Virtual Private Network (VPN). Using network 228, the information processing system 202 is able to access a service provider server 252 to implement the present invention.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information processing system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. In certain embodiments, system memory 236 may also include a Browser 246 having program modules and instructions enabling a World Wide Web (WWW) client (i.e., information processing system 202) to send and receive network messages to the Internet using HyperText Transfer Protocol (HTTP) messaging, thus enabling communication with service provider server 252. In various embodiments, system memory 236 may also include a concept drift updating system 248 having a knowledge graph engine 249. In various embodiments, the concept drift updating system 248 includes code for implementing the processes described hereinbelow. In certain embodiments, the information processing system 202 is able to download the concept drift updating system 248 from a service provider server 252.

The hardware elements depicted in the information processing system 202 are not intended to be exhaustive, but rather are representative to highlight components that may be used to implement the present invention. For instance, the information processing system 202 may include alternate memory storage devices such as magnetic cassettes, DVDs, Bernoulli cartridges, and the like. These and other variations are intended to be within the spirit, scope and intent of the present invention.

The disclosed concept drift updating system 248 is designed with an appreciation that concepts associated with a ground truth corpus may change over time. The design and operation of the concept drift updating system 248 also appreciate that it is not always necessary to retrain the entire ground truth corpus in response to a given concept drift. Rather, certain embodiments of the concept drift updating system 248 execute operations that employ a knowledge graph engine 249 to automatically generate a knowledge graph using the ground truth corpus. Certain embodiments of the knowledge graph include concept nodes that are connected by one or more edges to specific documents within the ground truth corpus. As used herein, a document may include a compilation of pages within the corpus, a specific grouping of pages within the corpus, passages within specific pages of the corpus, etc. Certain embodiments of the concept drift updating system 248 update concept definitions within the knowledge graph to reflect concept drift. Certain embodiments use the edges for a concept that changes as a result of a concept drift to identify documents within the ground truth corpus that are to be reevaluated in view of the concept drift. Certain embodiments automatically present the identified documents to a user at a user interface for reevaluation. In certain embodiments, the identified documents may be presented in a prioritized order based on the likelihood that the document is affected by the concept drift.

Figure 3:
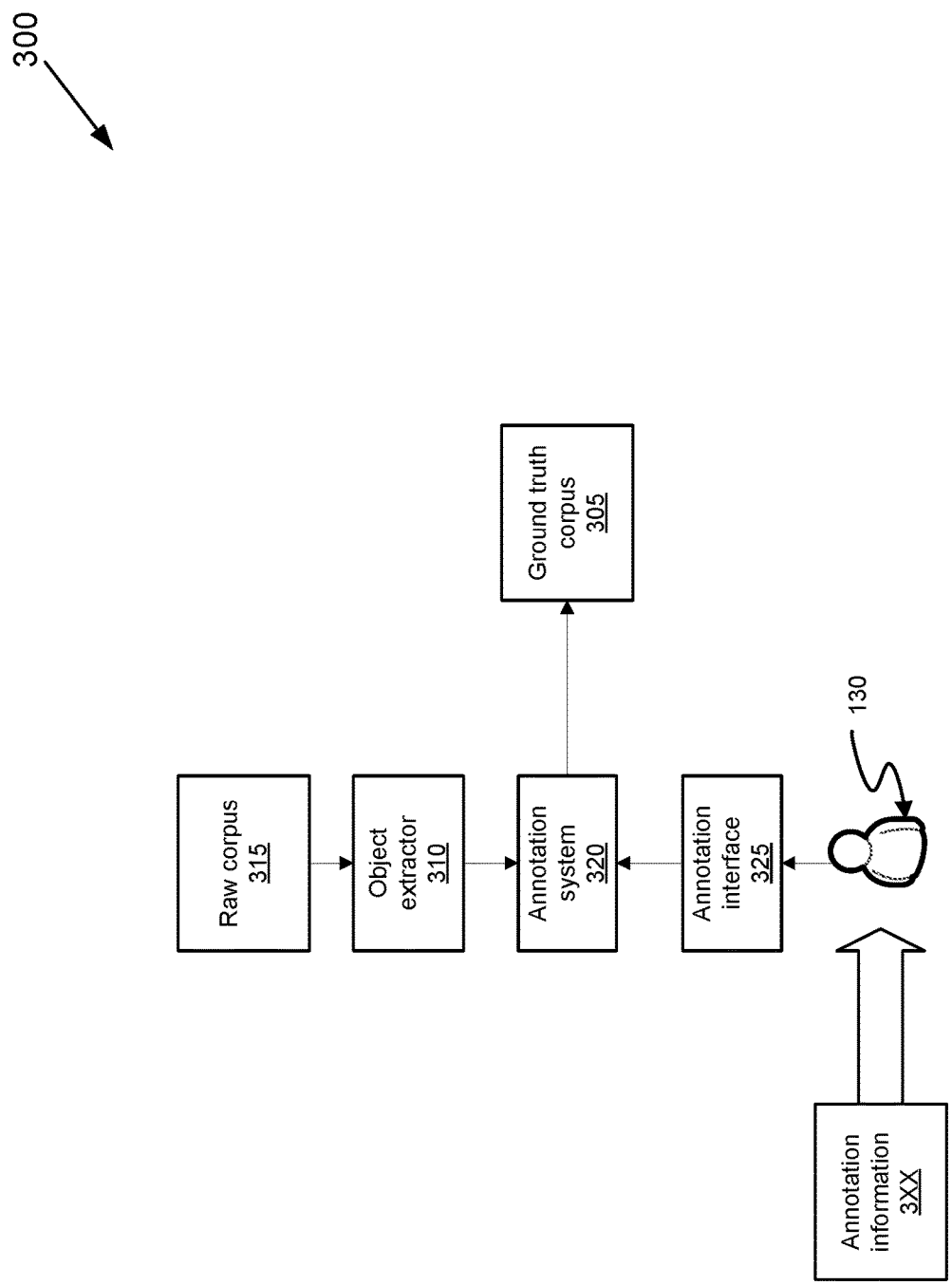
FIG. 3 depicts a functional block diagram of an electronic environment in which certain embodiments of a ground truth corpus may be generated.

FIG. 3 depicts a functional block diagram of an electronic environment 300 in which certain embodiments of a ground truth corpus 305 may be generated. In certain embodiments, an object extractor 310 analyzes a raw corpus 315 to extract objects from the raw corpus that are to be annotated by a user. In certain embodiments, the raw corpus 315 includes electronic documents having language that a domain expert, such as user 130 wishes to include in the ground truth corpus 305. In certain embodiments, the raw corpus 315 includes documents from a single domain, while in other embodiments the raw corpus 315 includes documents from multiple domains. In certain embodiments, the annotation system 320 presents the extracted objects to the user 325 at an annotation interface 330, which the user employs for annotation elements of the raw corpus 315 to generate the ground truth corpus 305.

In certain embodiments, such as those employing IBM's Watson® technology, the objects may include entities and intents. In certain embodiments, intents are a group of examples that a user might use to communicate a specific goal or idea, while entities provide a way of handling parts of a user input that is used to alter the way the conversational system response to an intent. In certain embodiments, the user 3 to 5 enters intents objects by defining an intent category and entering intent language that may be encountered by the conversational system when a user wishes to express an intent in that category. In certain embodiments, the user 325 may enter entity objects by defining an entity category and entering language that may be encountered by the conversational system with respect to the entity categories.

Figure 4:
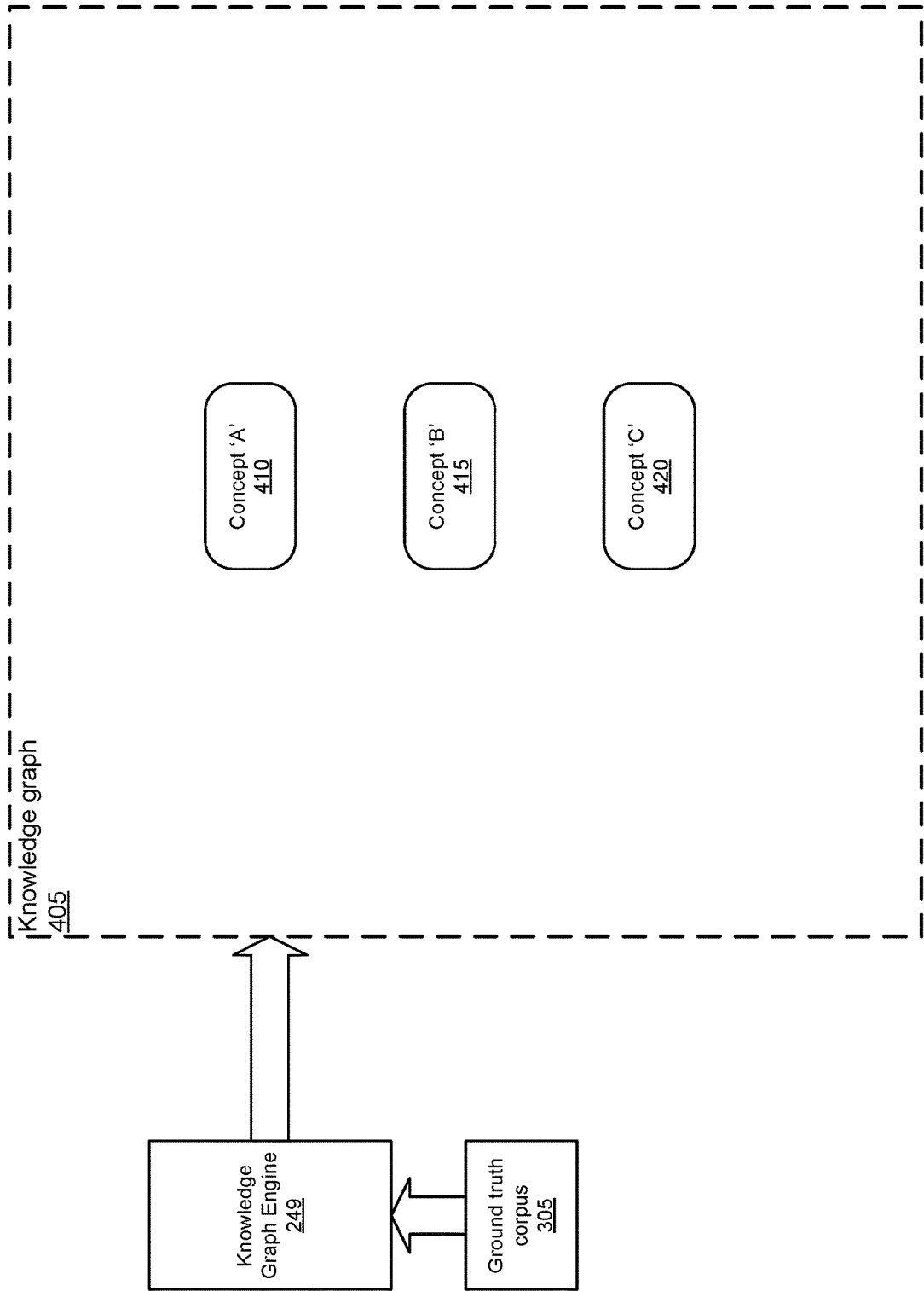
FIG. 4 is a block diagram depicting the results of a set of operations used to establish a knowledge graph in accordance with certain embodiments of the disclosed system.

FIG. 4 is a block diagram depicting the results of a set of operations used to establish a knowledge graph in accordance with certain embodiments of the disclosed system. In certain embodiments, the knowledge graph engine 249 accesses the ground truth corpus 305 to generate a knowledge graph 405. At a first stage of the generation of the knowledge graph 405, the knowledge graph engine 249 extracts multiple concepts from the ground truth corpus 305. The concepts may be extracted from the ground truth corpus 305 in various manners known in the art. In the illustrated example, the concepts extracted from the ground truth corpus 305 include Concept 'A' 410, Concept 'B' 415, and Concept 'C' 420. Each of the concepts 410, 415, and 420 are designated by the knowledge graph engine 249 as nodes within the knowledge graph 405.

Figure 5:
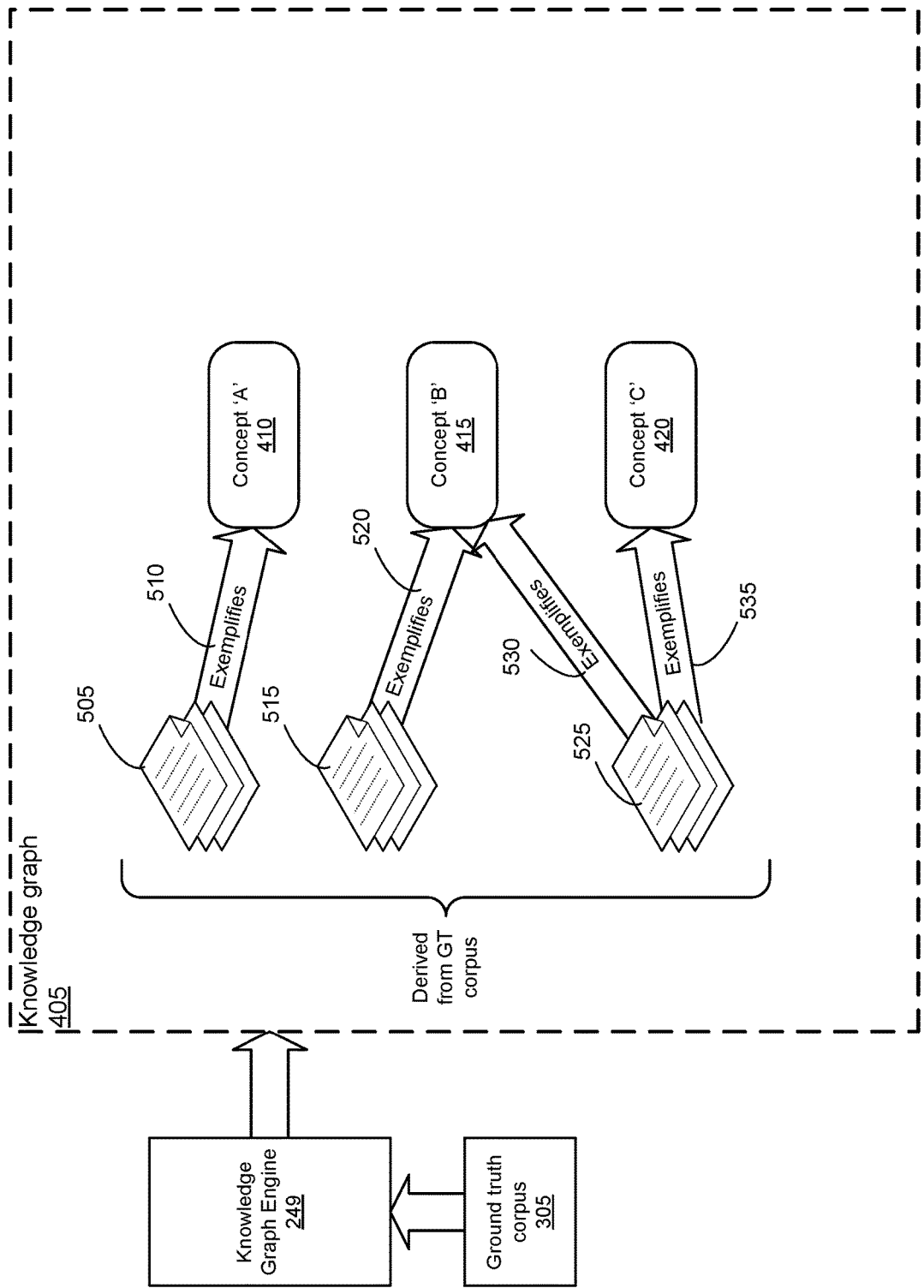
FIG. 5 is a block diagram depicting the results of operations used to establish further portions of the knowledge graph in accordance with certain embodiments of the disclosed system.

FIG. 5 is a block diagram depicting the results of operations used to establish further portions of the knowledge graph 405 in accordance with certain embodiments of the disclosed system. In certain embodiments, a node is created for each document within the ground truth corpus. In certain embodiments, an edge is added between each document node and corresponding concept node. Depending on the relationships between the document nodes and corresponding concept nodes within the knowledge graph 405, the document nodes and concept nodes may be linked using one-to-one edges, one-to-many edges, many-to-one edges, and/or in many-to-many edges. In the illustrated example, document nodes 505 are linked to Concept 'A' 410 by one or more edges 510. Further, in the illustrated example, document nodes 515 are linked to Concept 'B' at one or more edges 520. Still further, in the illustrated example, document nodes 525 are linked to Concept 'B' 415 by one or more edges 530, and to Concept 'C' 420 by one or more edges 535. In certain embodiments, operations in which edges are created between document nodes and corresponding concept nodes proceeds until there is at least one edge between each document node and at least one corresponding concept node. In certain embodiments, however, the ground truth corpus may be insufficient to define and edge between a document node and a concept node. In certain embodiments, the knowledge graph engine 245 may create a miscellaneous concept node for such documents.

Figure 6:
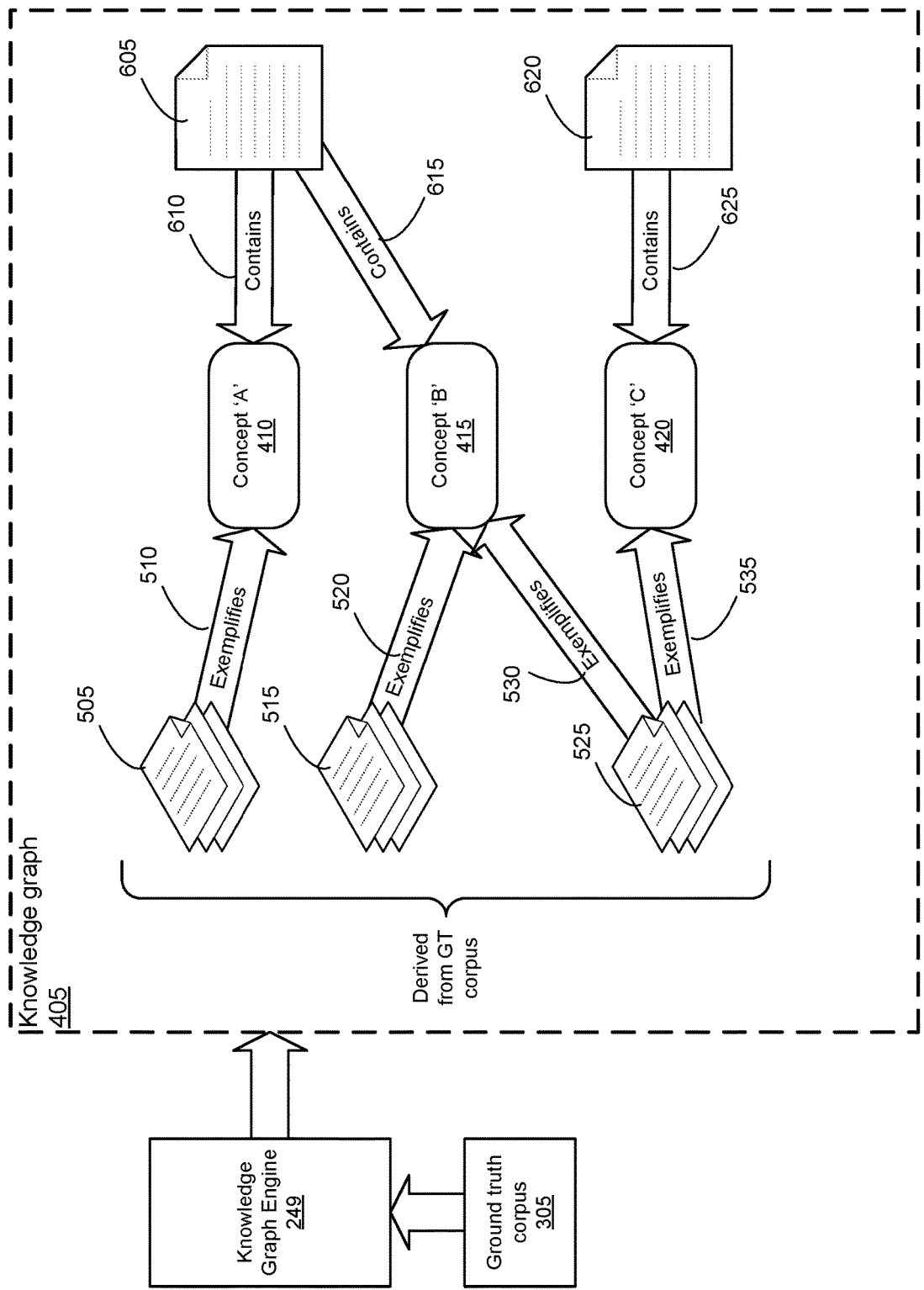
FIG. 6 is a block diagram depicting results of operations used to establish further portions of the knowledge graph in accordance with certain embodiments of the disclosed system.

FIG. 6 is a block diagram depicting results of operations used to establish further portions of the knowledge graph 405 in accordance with certain embodiments of the disclosed system. In certain embodiments, one or more documents within the ground truth corpus 305 may include context definitions for the concepts in the corpus. In certain embodiments, one or more documents outside of the ground truth corpus 305 may include context definitions for the concepts in the corpus. In certain embodiments, context definitions for the concepts of the ground truth corpus 305 may be directly entered by a user through a user interface. In certain embodiments, the context definitions may come from documents both external a combination of one or more documents within the ground truth corpus 305, one or more documents external to the ground truth corpus 305, and/or context definitions entered by a user through a user interface.

In certain embodiments, the knowledge graph engine 249 generates context nodes in the knowledge graph 405 corresponding to the context definitions. In certain embodiments, an edge is generated within the knowledge graph 405 between each context node and one or more concept nodes defined by the context node. In the illustrated example, context node 605 includes one or more edges 610 with Concept 'A' 410, and one or more edges 615 with Concept 'B' 415. As such, one context node 605 define multiple concepts. As further shown in the illustrated example, context node 620 includes one or more edges 625 with Concept 'C' 420. As such, only one concept node includes context definitions for Concept 'C' 420.

Figure 7:
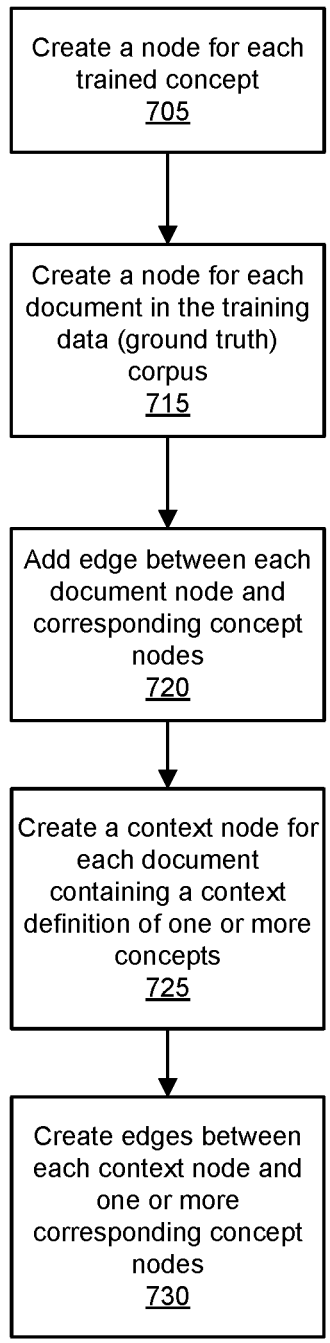
FIG. 7 is a flowchart depicting exemplary operations that may be executed by the disclosed system to generate a knowledge graph that may be used in minimizing reevaluation of documents during updating of a ground truth corpus in response to concept drift.

FIG. 7 is a flowchart depicting exemplary operations that may be executed by the disclosed system to generate a knowledge graph that may be used in minimizing reevaluation of documents during updating of a ground truth corpus in response to concept drift. In certain embodiments, a node is created for each trained concept at operation 705. In this example, a node is created for each document in the ground truth corpus at operation 715, and one or more edges are generated between each document node and one or more corresponding concept nodes at operation 720. At operation 725, a context node is generated within the knowledge graph for each context definition, such as one defined by one or more documents, and the concept nodes that context nodes define. At operation 730, an edge is created between each context node and one or more corresponding concept nodes that are defined by the context node. In certain embodiments, execution of the operations shown in FIG. 7 will result in a knowledge graph of the type shown in FIG. 6. However, it will be recognized that the specific knowledge graph nodes and specific edges generated from each ground truth corpus are likely to be different. As such, it is not intended to limit the scope of the present disclosure to specific documents, concepts, and edges shown in these examples.

Figure 8:
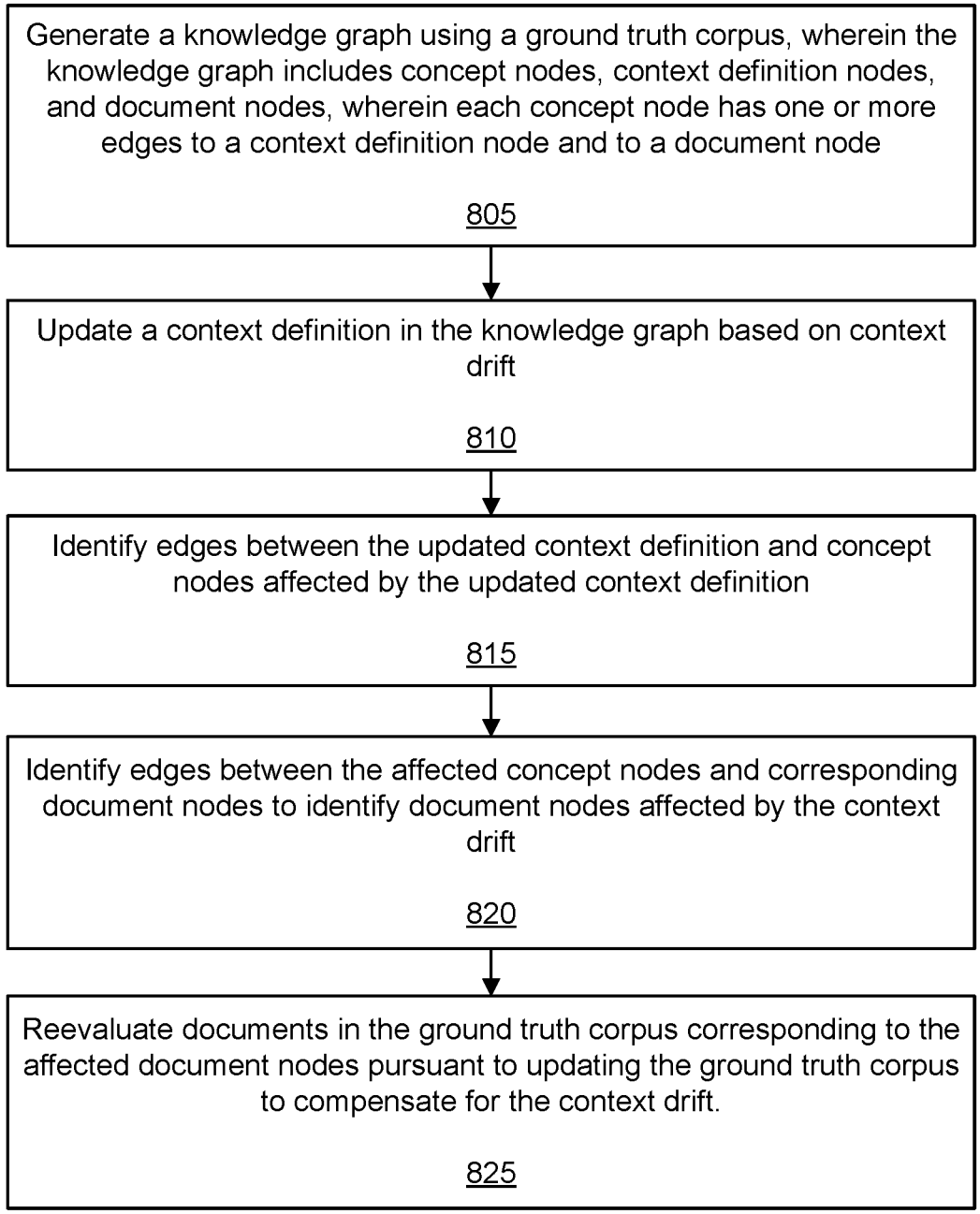
FIG. 8 is a simplified flowchart depicting operations that may be executed in certain embodiments of the disclosed system pursuant to updating the ground truth corpus.

FIG. 8 is a simplified flowchart depicting operations that may be executed in certain embodiments of the disclosed system pursuant to updating the ground truth corpus. In certain embodiments, a knowledge graph is generated using a ground truth corpus at operation 805. In certain embodiments, the knowledge graph includes concept nodes, context definition nodes, and document nodes. In certain embodiments, each concept node has one or more edges to a context definition node and to a document node. In the illustrated example, a context definition in the knowledge graph is updated at operation 810 based on context drift. At operation 815, edges between the updated context definition and concept nodes affected by the updated context definition are identified. At operation 820, edges between the affected concept nodes and corresponding document nodes are queried to identify document nodes affected by the context drift. In certain embodiments, documents in the ground truth corpus corresponding to the affected document nodes are reevaluated at operation 825 pursuant to updating the ground truth corpus to compensate for the context drift.

Figure 9:
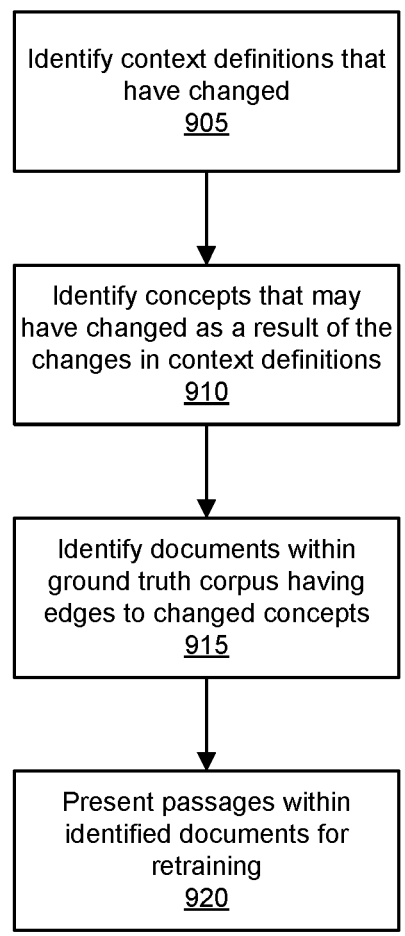
FIG. 9 is a flowchart depicting operations that may be executed in certain embodiments of the disclosed system.

FIG. 9 is a flowchart depicting operations that may be executed in certain embodiments of the disclosed system. In this example, it is assumed that a knowledge graph has already been generated from a ground truth corpus and that the ground truth corpus is to be updated in response to concept drift. As shown, the context definitions that have changed are identified at operation 905. Such changes in context definitions correspond to changes in the defined concepts and constitute concept drift. In certain embodiments, the context definitions may include definitions that supplement, change, and/or override existing context definitions. In certain embodiments, a context definition that supplements an existing context node may be added as a new independent context node and linked within the knowledge graph by an edge with the context node that it supplements. In certain embodiments, a new context definition that overrides an existing context definition may replace the existing context node. In certain embodiments, the existing context definition is merely removed and replaced with the new context node without removing the edges associated with the prior context node. In such instances, the new context node is linked with the same concept nodes as the prior context node within the knowledge graph.

In certain embodiments, concept nodes within the knowledge graph that may have been affected changes in the context definitions are identified at operation 910. To this end, the knowledge graph may be queried to identify any concept nodes having edges with new context nodes and/or supplemented context nodes. At operation 915, the knowledge graph may be queried to identify documents within the ground truth corpus having edges with the concept nodes that may have been affected by the changes in the context definitions. In certain embodiments, only the documents within the ground truth corpus having edges with concept nodes that may have been affected are subject to reevaluation in view of the concept drift. In certain embodiments, complete documents and/or passages within the identified documents may be presented to a user at operation 920 for retraining. In many instances, only a subset of the documents within a ground truth corpus are identified for retraining. As such, activities relating to retraining a ground truth corpus of a processing system in response to concept drift may be substantially reduced.

Figure 10:
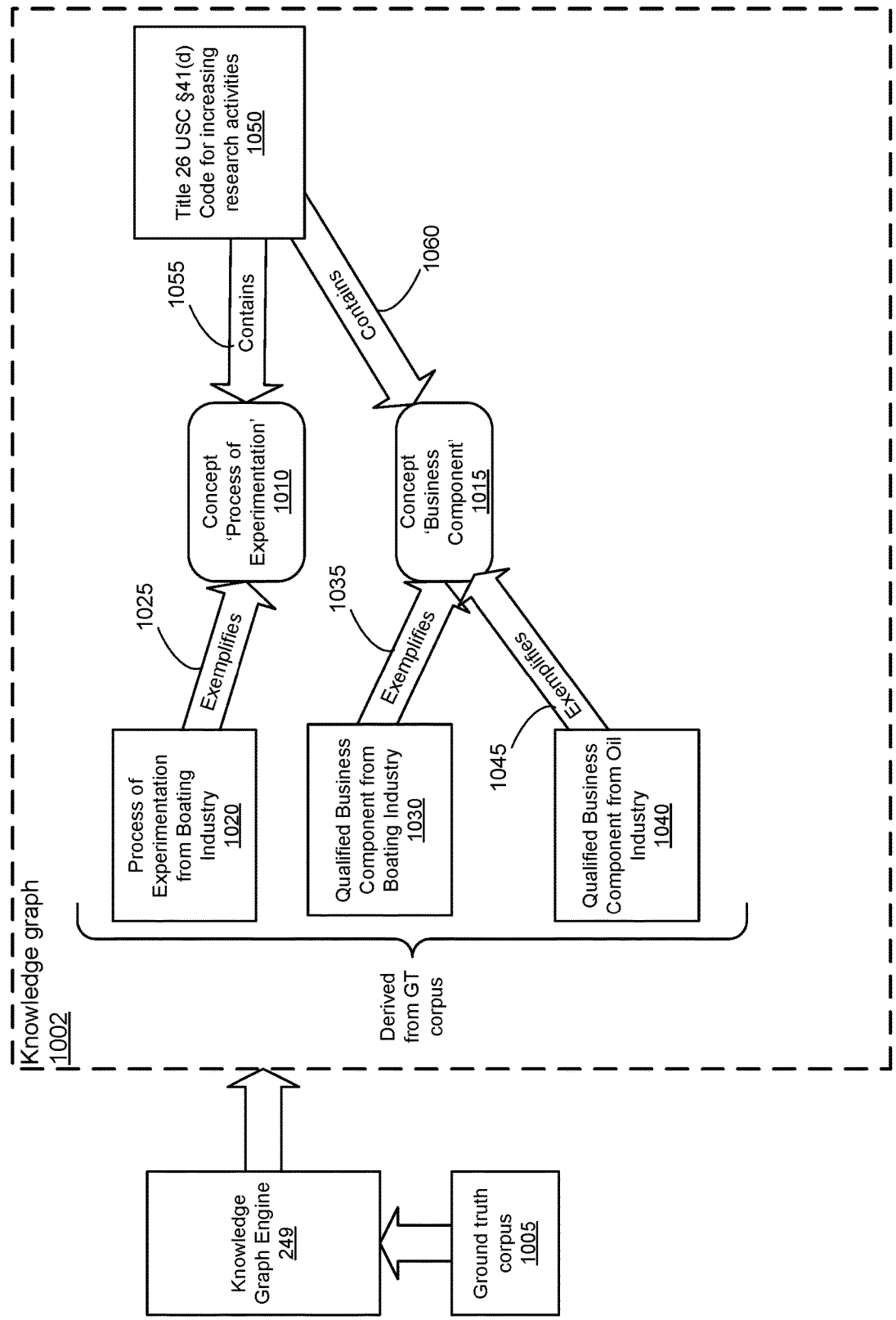
FIG. 10 is a simplified block diagram depicting a knowledge graph constructed in accordance with an embodiment of the disclosed system.

FIG. 10 is a simplified block diagram depicting a knowledge graph 1002 constructed in accordance with an embodiment of the disclosed system. In this example, the knowledge graph 1002 is generated from a ground truth corpus 1005 that is based on information included in a government statute. In this example, two concept nodes 1010 and 1015 have been extracted from the ground truth corpus 1005 by the knowledge graph engine 245. Concept node 1010 relates to the concept of a "Process of Experimentation", while concept node 1015 relates to the concept of a "Business Component."

In this example, the knowledge graph engine 249 creates document nodes 1020 for documents within the ground truth corpus 1005 relating to the concept of a process of experimentation from the boating industry. Certain embodiments generate one or more edges 1025 between the document nodes 1020 and corresponding concept nodes 1010. In this example, the knowledge graph engine 249 also generates document nodes 1030 for documents relating to qualified business components from the boating industry, and provides one or more edges 1035 with the corresponding concept node 1015. Certain embodiments generate document nodes 1040 for documents relating to qualified components from the oil industry, and generate edges 1045 between the document nodes 1040 and the corresponding concept node 1015.

In the example of FIG. 10, the context definitions for the "Process of Experimentation" concept node 1010 and "Business Component" concept node 1015 are based on a government statute, shown here as Title 26 U.S.C. § 41(d), directed to a code for increasing research activities. To this end, a context node 1050 is generated that includes context definitions for concept nodes 1010 and 1015. One or more edges 1055 are generated between the portions of the context node 1050 defining a process of experimentation and the corresponding concept 1010. Further, one or more edges 1060 are generated between the portions of the context node 1050 defining a business component and the corresponding concept 1015. It will be recognized by those skilled in the art, based on the teachings of this disclosure, that other concepts and contexts may be used, and FIG. 10 merely shows one example.

Figure 11:
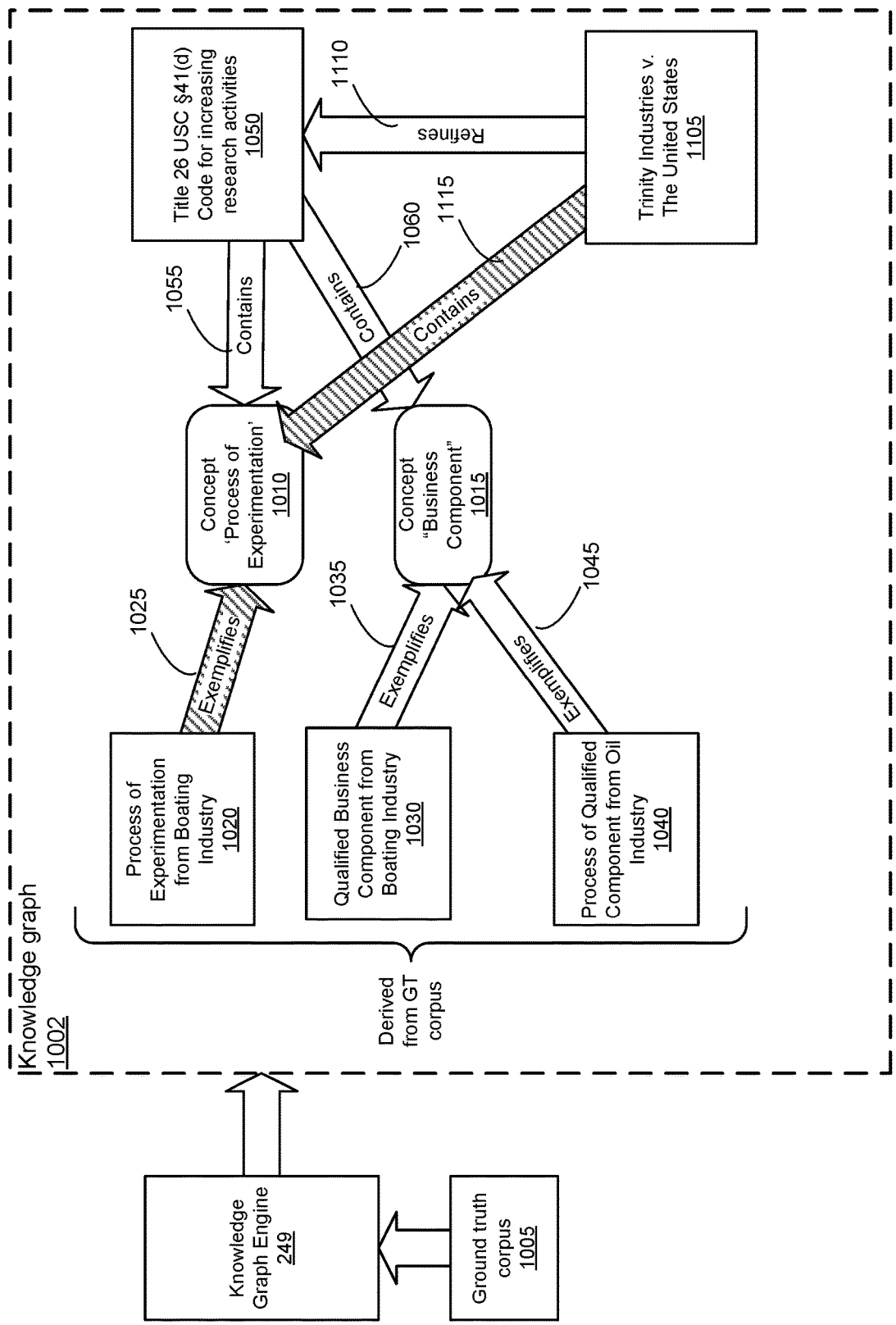
FIG. 11 is a simplified block diagram depicting one manner of using the knowledge graph to identify documents within the ground truth corpus that may need to be reevaluated in response to concept drift in accordance with an embodiment of the disclosed system.

FIG. 11 is a simplified block diagram depicting one manner of using the knowledge graph 1002 to identify documents within the ground truth corpus 1005 that may need to be reevaluated in response to concept drift in accordance with an embodiment of the disclosed system. In this example, context definitions in the context node 1050 are being refined in response to new case law, shown here as Trinity Industries v. The United States, which refines the definition of a "process for experimentation" as found in context node 1050. In certain embodiments, a new context node 1105 is generated within the knowledge graph 1002 for the refining case law and linked with one or more edges 1110 to those portions of the context node 1050 relating to a "process for experimentation." Although the new case law refines the definition of a "process for experimentation, it does not impact the context definition for a "business component." Accordingly, context node 1105 only has edges to the context definition for a "process for experimentation" within context node 1050. As shown in this example, a concept node 1010 is already present in the knowledge graph 1002 for a "process for experimentation." Context node 1050, in turn, already has edges 1055 with the concept node 1010. As such, the knowledge graph 1002 may be queried to locate edges of the context node 1050 that are common to both edges 1055 and edges 1110. In the example shown in FIG. 11, the common edges are shown as one or more edges 1115. Concept node 1010 has edges to document nodes 1020. Since there are no common nodes between context node 1105 and concept node 1015, only documents within the ground truth corpus 1005 corresponding to document nodes 1020 may have a need for reevaluation. Based on the knowledge graph 1002, documents within the ground truth corpus 1005 corresponding to document nodes 1030 and 1040 need not be reevaluated in response to the context change introduced by context node 1105.

Figure 12:
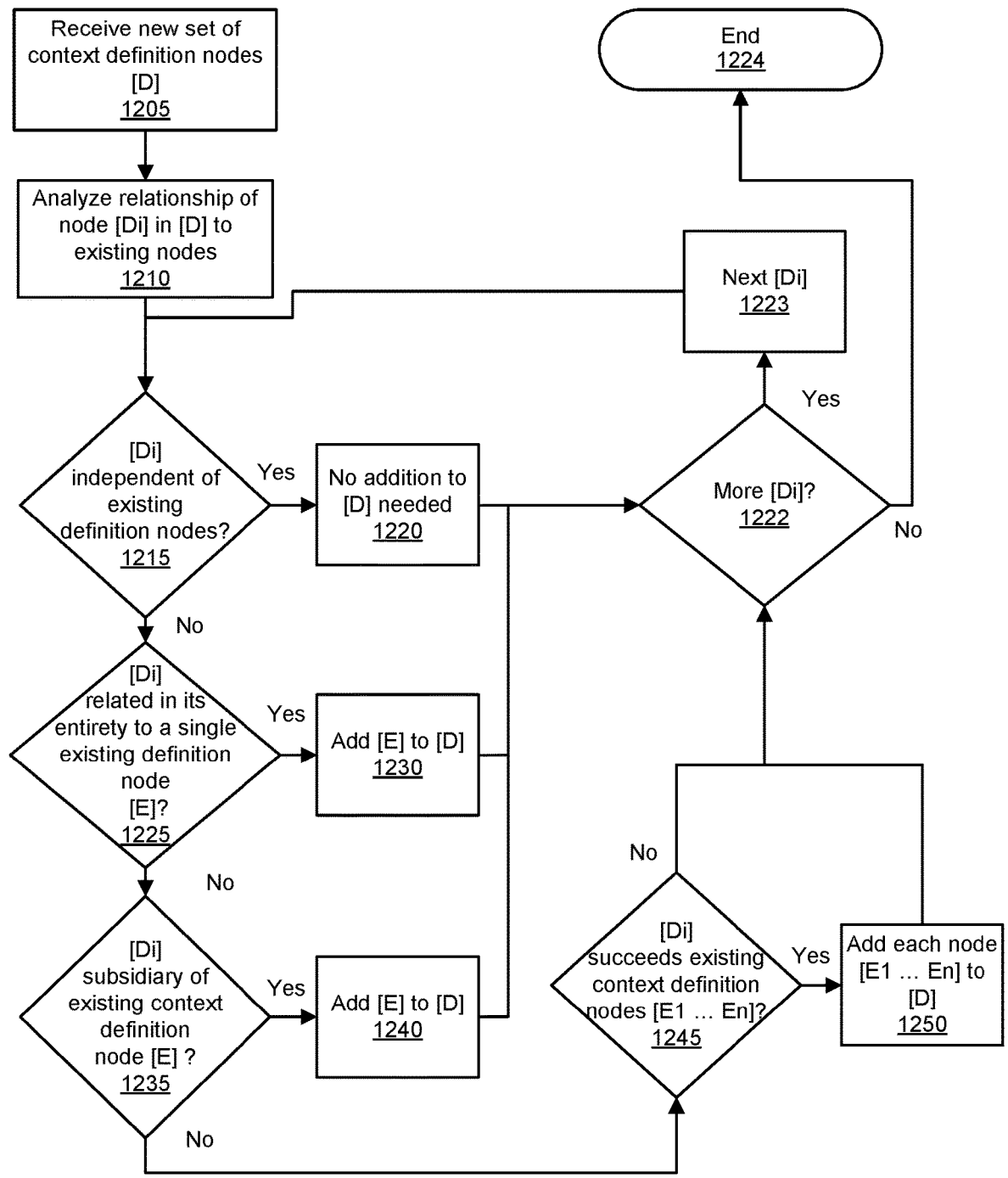
FIG. 12 is a flowchart depicting operations that may be used to handle new context definitions in an existing knowledge graph.

FIG. 12 is a flowchart depicting operations that may be used to handle the aggregation of potentially affected context definitions based on the addition of new context definitions to the knowledge graph. Beginning with a set [D] of newly added context definition nodes received at operation 1205, [D] can be augmented by analyzing the relationships, such as the edges, of each node [Di] in [D] to other context definitions already in the knowledge graph starting at operation 1210. In certain embodiments, the relationship can manifest in at least four ways. In the event the new node [Di] is completely independent of existing context definition nodes [E] as determined at operation 1215, no additions to [D] are required as shown at operation 1220 and a determination is made at operation 1222 as to whether there are more nodes [Di] in [D]. If there are more nodes in [D], the next node [Di] is retrieved at operation 1223. If there are no further nodes, execution is completed at operation 1224.

In the event that [Di] is a refinement, augmentation, or otherwise related in its entirety to a single existing node [E] as determined at operation 1225, [E] is added to [D] at operation 1230 and a check is made at operation 1222 to determine whether there are more nodes [Di] in [D]. Otherwise, a check is made to determine whether [Di] is a subsidiary of an existing node [E] at operation 1225. If so, [E] is added to [D] at operation 1230. If [Di] succeeds a set of existing nodes [E1 . . . En] as determined at operation 1245, each node [E1 . . . En] is added to [D] at operation 1250. As shown with respect to operations 1222 and 1223, the aggregation for each [Di] in [D].

Figure 13:
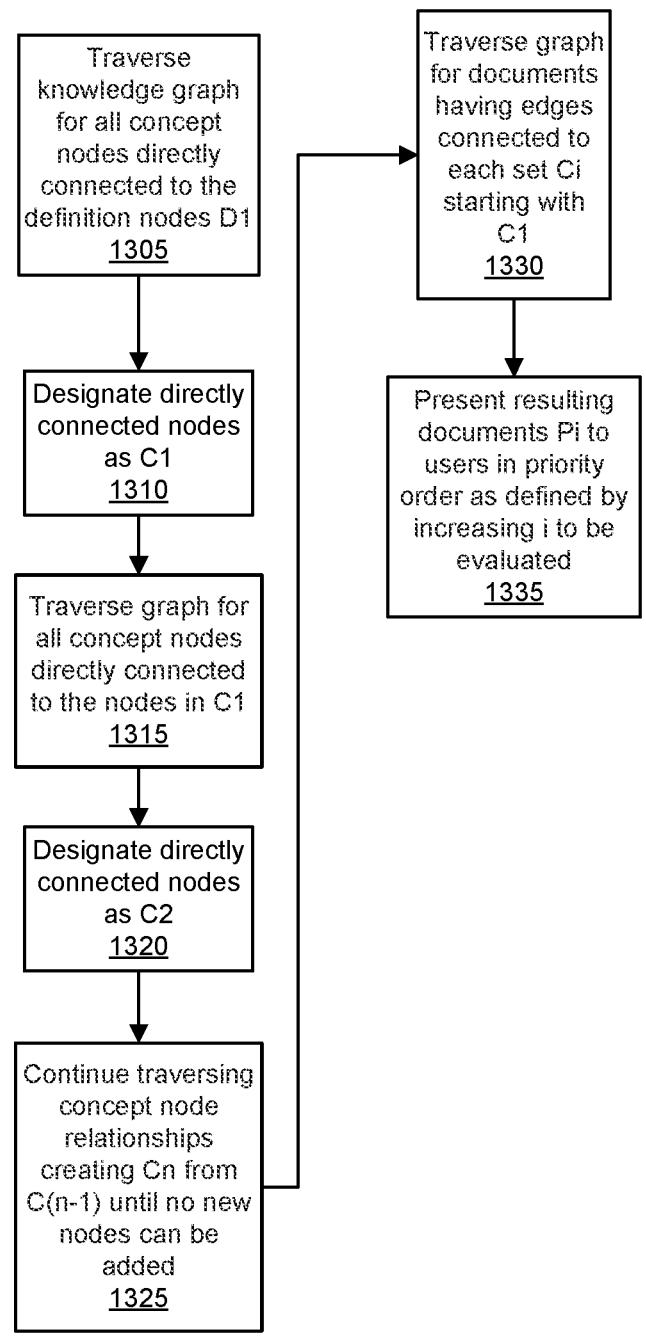
FIG. 13 is a flowchart depicting operations that may be executed in certain embodiments of the disclosed system to identify documents in the ground truth corpus that potentially need reevaluation based on changes to the context definitions.

FIG. 13 is a flowchart depicting operations that may be executed in certain embodiments of the disclosed system to identify documents in the ground truth corpus that potentially need reevaluation based on changes to the context definitions. In certain embodiments, all of the related concept nodes that have a directed edge to drifting context definitions are identified at operation 1305. At operation 1310, the knowledge graph is traversed for all concept nodes directly connected to the definition nodes D1. At operation 1310, the resulting set of nodes is designated as C1. In certain embodiments, the knowledge graph is then traversed for all concept nodes directly connected to the nodes in C1 at operation 1315. The resulting set of nodes may be designated as C2 at operation 1320. In certain embodiments, these operations are repeated at operation 1325 until no new nodes can be added.

Certain embodiments use the results of operations 1305 through 1325 to query the knowledge graph for documents that potentially need to be reevaluated in response to changes in the context definitions. In certain embodiments, the knowledge graph is traversed at operation 1330 for passages connected to each set $C_i$, starting with C1. In certain embodiments, documents connected to $C_i$ may be represented as $P_i$. In certain embodiments, the documents within the ground truth corpus corresponding to documents $P_i$ are provided for reevaluation to a user in priority order as defined by increasing i. In certain embodiments, the documents may be presented to the user at an annotation interface to facilitate re-annotation of the documents to generate a ground truth corpus that has been modified in response to concept drift.

Although the present invention has been described in detail, it should be understood that various changes, substitutions and alterations can be made hereto without departing from the spirit and scope of the invention as defined by the appended claims.

What is claimed is:

1. A computer-implemented method for minimizing reevaluation of a ground truth corpus in response to concept drift, comprising:
    generating a knowledge graph using a ground truth corpus, wherein the knowledge graph includes concept nodes, context definition nodes, and document nodes, wherein each concept node has one or more edges to a context definition node and to a document node;
    updating a context definition node in the knowledge graph based on context drift;
    identifying edges between the updated context definition node and concept nodes affected by the updated context definition; and
    identifying edges between the affected concept nodes and corresponding document nodes to identify document nodes affected by the context drift; and
    reevaluating documents in the ground truth corpus corresponding to the affected document nodes pursuant to updating the ground truth corpus to compensate for the context drift; and wherein
    the identifying edges between the updated context definition node and concept nodes affected by the updated context definition comprises:
        traversing the knowledge graph for all concept nodes having direct edges to a set of context nodes D1 that have been updated in response to the concept drift;
        designating the concept nodes having direct edges to the set of context nodes D1 as a set of concept nodes C1;
        traversing the knowledge graph for all concept nodes having direct edges to the set of concept nodes C1;
        designating concept nodes having direct edges to the set of concept nodes C1 as a set of concept nodes C2; and
        continuing traversal of concept node relationships and creating a set of concept nodes C(n) having direct edges to a set of concept nodes C(n-1) until no new concept nodes can be added to a set of concept nodes.

2. The method of claim 1, further comprising:
    presenting passages of the ground truth corpus corresponding to the affected document nodes at a user interface for reevaluating the passages in the ground truth corpus.

3. The method of claim 2, wherein
    the passages within the ground truth corpus corresponding to the affected document nodes are presented for reevaluation in priority order.

4. The method of claim 1, wherein updating a context definition node in response to concept drift comprises:
    receiving a set of one or more new context definitions [D]; and
    if a new context definition [Di] of [D] related as a refinement to an existing definition node [E], add a node for [E] to the set of context definition nodes [D].

5. The method of claim 1, wherein updating a context definition node in response to concept drift comprises:
    receiving a set of one or more new context definitions [D]; and
    if a new context definitions [Di] succeeds a set of existing context definitions [E1 . . . En], add a node for each [E1 . . . En] to the set of context definition nodes [D].

6. The method of claim 1, wherein updating a context definition node in response to concept drift comprises:
    receiving a set of one or more new context definitions [D]; and
    if a new context definition [Di] is independent of a set of existing context nodes [E], refrain from adding a node to [D].

7. A system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations and comprising instructions executable by the processor and configured for:
        generating a knowledge graph using a ground truth corpus, wherein the knowledge graph includes concept nodes, context definition nodes, and document nodes, wherein each concept node has one or more edges to a context definition node and to a document node;
        updating a context definition node in the knowledge graph based on context drift;
        identifying edges between the updated context definition node and concept nodes affected by the updated context definition; and
        identifying edges between the affected concept nodes and corresponding document nodes to identify document nodes affected by the context drift; and
        reevaluating documents in the ground truth corpus corresponding to the affected document nodes pursuant to updating the ground truth corpus to compensate for the context drift; and wherein
    the identifying edges between the updated context definition node and concept nodes affected by the updated context definition comprises:
        traversing the knowledge graph for all concept nodes having direct edges to a set of context nodes D1 that have been updated in response to the concept drift;
        designating the concept nodes having direct edges to the set of context nodes D1 as a set of concept nodes C1;
        traversing the knowledge graph for all concept nodes having direct edges to the set of concept nodes C1;
        designating concept nodes having direct edges to the set of concept nodes C1 as a set of concept nodes C2; and
        continuing traversal of concept node relationships and creating a set of concept nodes C(n) having direct edges to a set of concept nodes C(n-1) until no new concept nodes can be added to a set of concept nodes.

8. The system of claim 7, further comprising:
    presenting passages of the ground truth corpus corresponding to the affected document nodes at a user interface for reevaluating the passages in the ground truth corpus.

9. The system of claim 8, wherein
the passages within the ground truth corpus corresponding to the affected document nodes are presented for reevaluation in priority order.

10. The system of claim 7, wherein updating a context definition node in response to concept drift comprises:
receiving a set of one or more new context definitions [D]; and
if a new context definition [Di] of [D] related as a refinement to an existing definition node [E], add a node for [E] to the set of context definition nodes [D].

11. The system of claim 7, wherein updating a context definition node in response to concept drift comprises:
receiving a set of one or more new context definitions [D]; and
if a new context definitions [Di] succeeds a set of existing context definitions [E1 . . . En], add a node for each [E1 . . . En] to the set of context definition nodes [D].

12. The system of claim 7, wherein updating a context definition node in response to concept drift comprises:
receiving a set of one or more new context definitions [D]; and
if a new context definition [Di] is independent of a set of existing context nodes [E], refrain from adding a node to [D].

13. A non-transitory, computer-readable storage medium embodying computer program code, the computer program code comprising computer executable instructions configured for:
generating a knowledge graph using a ground truth corpus, wherein the knowledge graph includes concept nodes, context definition nodes, and document nodes, wherein each concept node has one or more edges to a context definition node and to a document node;
updating a context definition node in the knowledge graph based on context drift;
identifying edges between the updated context definition node and concept nodes affected by the updated context definition; and
identifying edges between the affected concept nodes and corresponding document nodes to identify document nodes affected by the context drift; and
reevaluating documents in the ground truth corpus corresponding to the affected document nodes pursuant to updating the ground truth corpus to compensate for the context drift; and wherein
the identifying edges between the updated context definition node and concept nodes affected by the updated context definition comprises:
traversing the knowledge graph for all concept nodes having direct edges to a set of context nodes D1 that have been updated in response to the concept drift designating the concept nodes having direct edges to the set of context nodes D1 as a set of concept nodes C1;
traversing the knowledge graph for all concept nodes having direct edges to the set of concept nodes C1;
designating concept nodes having direct edges to the set of concept nodes C1 as a set of concept nodes C2; and
continuing traversal of concept node relationships and creating a set of concept nodes C(n) having direct edges to a set of concept nodes C(n-1) until no new concept nodes can be added to a set of concept nodes.

14. The non-transitory, computer-readable storage medium of claim 13, wherein the computer executable instructions are further configured for:
presenting passages of the ground truth corpus corresponding to the affected document nodes at a user interface for reevaluating the passages in the ground truth corpus.

15. The non-transitory, computer-readable storage medium of claim 13, wherein
the passages within the ground truth corpus corresponding to the affected document nodes are presented for reevaluation in priority order.

16. The non-transitory, computer-readable storage medium of claim 13, wherein updating a context definition node in response to concept drift comprises:
receiving a set of one or more new context definitions [D]; and
if a new context definition [Di] of [D] related as a refinement to an existing definition node [E], add a node for [E] to the set of context definition nodes [D].

17. The non-transitory, computer-readable storage medium of claim 13, wherein updating a context definition node in response to concept drift comprises:
receiving a set of one or more new context definitions [D]; and
if a new context definitions [Di] succeeds a set of existing context definitions [E1 . . . En], add a node for each [E1 . . . En] to the set of context definition nodes [D].

* * * * *